United States Patent
Madden et al.

(10) Patent No.: US 8,165,247 B1
(45) Date of Patent: Apr. 24, 2012

(54) UNFOLDED DECISION-DIRECTED LOOP, ARCHITECTURES, APPARATUSES AND SYSTEMS INCLUDING THE SAME, AND METHODS, ALGORITHMS AND SOFTWARE FOR REDUCING LATENCY IN DECISION-DIRECTED LOOPS

(75) Inventors: Michael Madden, Mountain View, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 670 days.

(21) Appl. No.: 12/337,564

(22) Filed: Dec. 17, 2008

Related U.S. Application Data

(60) Provisional application No. 61/016,687, filed on Dec. 26, 2007.

(51) Int. Cl.
*H03D 3/18* (2006.01)
(52) U.S. Cl. .................... 375/327; 375/317; 375/345
(58) Field of Classification Search .................. 375/232, 375/229, 327, 371, 373, 317, 345
See application file for complete search history.

(56) References Cited

U.S. PATENT DOCUMENTS
6,349,112 B1 * 2/2002 Shibata .................. 375/232
2003/0012303 A1 * 1/2003 Dati et al. ................ 375/316

OTHER PUBLICATIONS

Jan W.M. Bergmans; "Digital Baseband Transmission and Recording"; Phillips Research; Eindhoven, The Netherlands; pp. 452-455; Kluwer Academic Publishers 1996; Dordrecht, The Netherlands.
Jan W.M. Bergmans; "Digital Baseband Transmission and Recording"; Phillips Research; Eindhoven, The Netherlands; p. 386; Kluwer Academic Publishers 1996; Dordrecht, The Netherlands.
Heinrich Meyr, Marc Moeneclaey and Stefan A. Fechtel; "Digital Communication Receivers"; Synchronization, Channel Estimation, and Signal Processing; Wiley-Interscience Publication 1998; 281-283; New York, New York.

* cited by examiner

*Primary Examiner* — Kevin Kim

(57) ABSTRACT

Unfolded adaptive/decision-directed loops and correction circuits therefor, architectures, apparatuses and systems including the same, and methods, algorithms and software for reducing latency in an adaptive and/or decision-directed loop. Disclosed embodiments advantageously reduce effects of loop latency, improve the accuracy of corrections in an adaptive loop, and minimize overhead and delays associated with such improvements.

20 Claims, 5 Drawing Sheets

(Background)

UNFOLDED DECISION-DIRECTED LOOP, ARCHITECTURES, APPARATUSES AND SYSTEMS INCLUDING THE SAME, AND METHODS, ALGORITHMS AND SOFTWARE FOR REDUCING LATENCY IN DECISION-DIRECTED LOOPS

RELATED APPLICATIONS

This application claims the benefit of U.S. Provisional Patent Application No. 61/016,687, filed Dec. 26, 2007, incorporated herein by reference in its entirety.

FIELD OF THE INVENTION

The present invention generally relates to the field of communications circuits and systems. More specifically, embodiments of the present invention pertain to decision-directed loops and/or correction circuits therefor, architectures, apparatuses and systems including the same, and methods, algorithms and software for reducing latency in a decision-directed loop.

BACKGROUND

Decision-directed loops are loops that use detected decisions to estimate a parameter and control an adaptive loop. Decision-directed loops are commonly used in communication systems to automatically estimate and track changing system parameters and reduce errors due to changing noise conditions. Examples of common decision-directed loops are timing tracking loops (decision-directed phase-locked-loop, or DD-PLL), automatic gain control (AGC), and baseline (or DC) wander compensation circuits.

Traditional decision-directed loops use detector decisions to estimate a system parameter, and then feed back the estimate to the input samples to improve the detection quality. An example of this is a simple baseline wander compensation circuit described in FIG. 1.

In many communication systems, the input signal is assumed to have a constant, known reference level, or baseline. Channel noise, however, may cause the reference level to wander, or the reference level may be constant but non-zero. The reference level is also sometimes known as the DC level, so this is often referred to as DC wander or baseline wander. In many communication systems, DC wander or baseline wander has a negative effect on the detector performance.

A simple way to combat baseline wander is to use the detector decisions to estimate the baseline offset, feed the estimate back to the input samples, and subtract off the estimate. The detector, for example a Viterbi detector, usually needs several samples to issue a decision. Then the decision-directed estimate of the baseline offset that is fed back is delayed. This means that the estimate is older than the samples that the estimate is applied to. If the state of the baseline offset has changed in the time it takes to estimate the offset, then the applied correction may not be effective.

FIG. 1 shows an example of a simple baseline wander correction loop 100. The noisy input samples $y_k$ are fed to a detector 110, which estimates the transmitted information bits $\hat{b}_k$. If the detector 110 has a delay of N, then the estimated bits will come out delayed as $\hat{b}_{k-N}$. For example, when the detector 110 is a Viterbi detector, the Viterbi traceback delay can be represented as N bits or states.

The samples $y_k$ may have an offset error due to baseline wander. An estimate of the baseline offset can be computed as the difference between the noisy sample $y_k$ and a reconstructed estimate of the sample $\hat{y}_k$. In the example of a partial response, maximum likelihood (PRML) magnetic recording system, the reconstruction filter 120 simply convolves the decisions $\hat{b}_{k-N}$ of the detector 110 and the PRML polynomial $H_k$ to produce the reconstructed sample $\hat{y}_{k-N}$. Before taking the difference between $y_k$ and $\hat{y}_{k-N}$, the samples $y_k$ are delayed by N in delay circuit 130 to align the samples $y_k$ to $\hat{y}_{k-N}$.

Taking the difference between the delayed samples of $y_k$ (i.e., $y_{k-N}$) and $\hat{y}_{k-N}$ using adder 140 produces the error signal $e_{k-N}$. To reduce estimation noise and smooth the estimate, the error signal is passed through a Low-Pass-Filter (LPF) 150.

The LPF 150 may have one of several embodiments, depending on the application. Often, a simple auto-regressive (AR) LPF is used, because an AR LPF can be implemented easily as an infinite-impulse-response (IIR) filter. A simple first-order AR LPF can have the recursive response:

$$y_k = \alpha \cdot y_{k-1} + \beta \cdot x_k \qquad (1)$$

where $x_k$ is the LPF input, $y_k$ is the LPF output, and $\alpha$ and $\beta$ are parameters that control the shape of the LPF response.

The LPF 150 may also be implemented as a moving-average (MA) filter. A MA LPF has a finite memory, whereas the AR LPF has an infinite memory. The finite memory of the MA LPF can be helpful to reduce the effect of prior noisy inputs. The MR LPF has the form (2):

$$y_k = \sum_{i=0}^{L-1} w_i \cdot x_{k-i} \qquad (2)$$

where $x_k$ is the LPF input, $y_k$ is the LPF output, and $w_i$ are a set of tap weights that control the shape of the LPF response. The simplest embodiment is to let all $w_i$ equal some constant C. The LPF 150 may also be implemented as more complicated filters such as a raised-cosine filter or Butterworth filter.

The LPF output is a smoothed estimate of the correction factor $c_{k-N''}$. The correction factor is subtracted from the input $y_k$ to reduce the baseline offset. Note that the correction factor is delayed with respect to the input samples by N" samples. If the baseline offset is slow moving and has not changed much in N" samples, then the correction factor may be effective in reducing the baseline offset. However, if the baseline error is fast moving, then the baseline offset in $y_k$ at the correction point (i.e., adder 160) may be different than the estimate in $c_{k-N''}$. Thus, the detector (and LPF) delay N" limits the effectiveness of the baseline wander correction loop 100.

SUMMARY

Embodiments of the present disclosure relate to decision-directed loops and/or correction circuits therefor, architectures, apparatuses and systems including the same, and methods, algorithms and software for reducing latency in an adaptive and/or decision-directed loop. For example, various embodiments concern a correction circuit for an adaptive loop (e.g., an alternative decision-directed loop), adapted to remove effects of loop latency. This may be accomplished by unfolding the traditional decision-directed loop and aligning the correction term and the sample.

A new circuit, architecture and method are proposed to reduce the effects of detector (or comparator and logic) delay in the decision-directed loop. This approach can be thought of as unfolding the traditional decision-directed loop. The concept is to compute an estimate of the correction term in a conventional manner, but then apply the correction term to a delayed version of the received samples. By delaying the samples before the correction term is applied, the correction term and the samples can be aligned in time. When the samples are aligned with the correction term, the effect of the detector or comparator/logic delay is removed. After the delayed samples are corrected by the correction term, the result is then fed to a second detector for estimation of the final decision.

The circuitry generally comprises a correction circuit to receive data and provide a correction signal based on the data, a delay circuit to delay the data by a predetermined amount of time to provide a delayed signal, a first mathematical operator to receive and mathematically combine the correction signal and the delayed signal to generate corrected data, and a signal processor to process the corrected data and produce an information signal therefrom. The delay of the delay circuit generally matches the delay of the correction circuit.

In various embodiments, the correction circuit comprises a detector to receive the data and provide produce a preliminary information signal, and a second mathematical operator to receive and mathematically combine the preliminary information signal and the delayed signal to generate an error signal. The correction circuit may further comprise a filter (e.g., a low pass filter) to filter the error signal and produce the correction signal. In additional embodiments, the correction circuit further comprises a second delay circuit configured to receive the data and delay the data by an amount of time to match the delay of the detector. The architectures and/or systems generally comprise those that include a circuit embodying one or more of the inventive concepts disclosed herein.

The method generally comprises processing the data using a preliminary data processing operation to produce a preliminary information signal; separately, delaying the data by a first predetermined amount of time to produce a first delayed signal; optionally, delaying the data by a second predetermined amount of time to produce a second delayed signal; combining the preliminary information signal and the first delayed signal to produce a correction signal; correcting either the first delayed signal or the second delayed signal with the correction signal to produce corrected data; and processing the corrected data using a final data processing operation to produce a processed information signal. The algorithms and software (e.g., computer-readable media) generally contain a computer-executable set of instructions configured to execute or perform the present method.

Embodiments of the present disclosure advantageously reduce or remove effects of loop latency, improve the accuracy of corrections in an adaptive and/or decision-directed loop, and minimize overhead and/or delays associated with such latency reductions and/or accuracy improvements. These and other advantages of the present invention (which may be applied to substantially any loop circuit in which there is a delay between the input signal to which a correction/feedback signal is applied and generation of that correction/feedback signal) will become readily apparent from the detailed description of various embodiments below.

DETAILED DESCRIPTION

Figure 1:
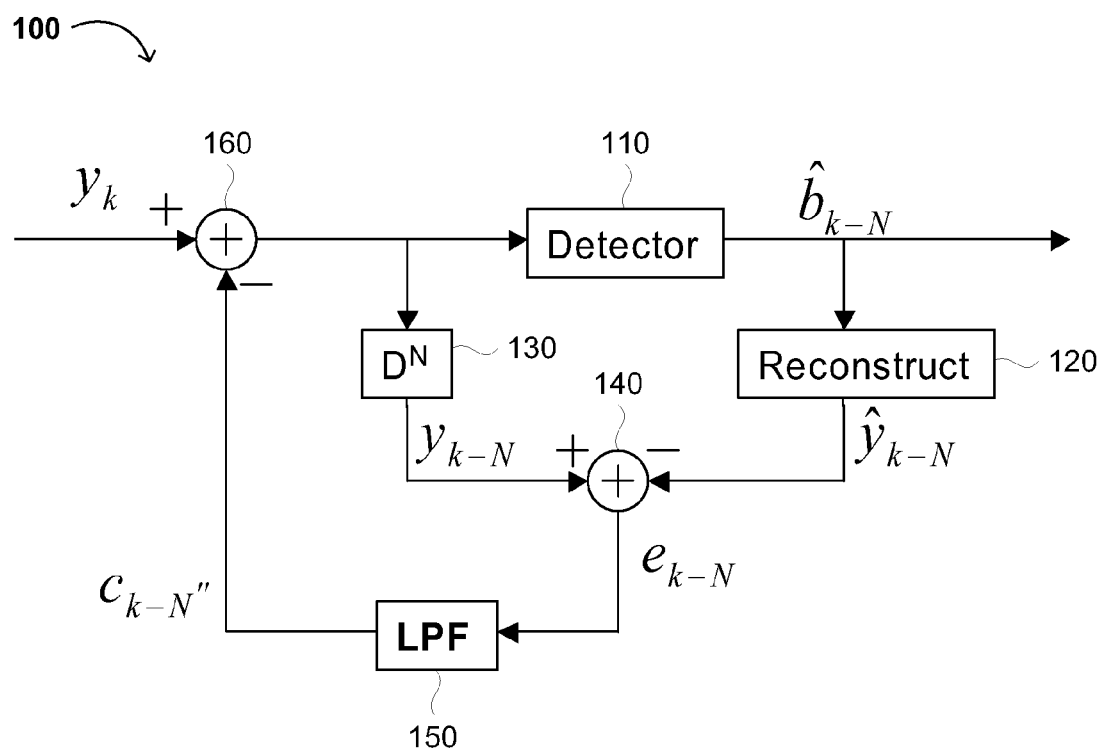
FIG. 1 is a block diagram showing a conventional decision-directed loop, adapted to correct for baseline wander.

Reference will now be made in detail to various embodiments of the invention, examples of which are illustrated in the accompanying drawings. While the invention will be described in conjunction with the exemplary embodiments provided below, the embodiments are not intended to limit the invention. On the contrary, the invention is intended to cover alternatives, modifications and equivalents that may be included within the scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

All of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The invention, in its various aspects, will be explained in greater detail below with regard to exemplary embodiments.

An Exemplary Circuit and/or Unfolded Decision-Directed Loop Architecture

In one aspect, the present invention relates to a circuit, comprising a correction circuit, one or more delay circuits, one or more mathematical operators, and a signal processor. The correction circuit is configured to receive data and/or a signal and provide a correction signal based thereon. The correction circuit delays the correction signal by a first predetermined amount of time. A first delay circuit is configured to receive the data/signal and delay the data/signal by a second predetermined amount of time to provide a delayed signal. A first mathematical operator is configured to receive and mathematically combine the correction signal and the delayed signal to generate corrected data and/or a corrected signal. The signal processor is configured to process the corrected data/signal and produce an information signal therefrom.

Figure 2:
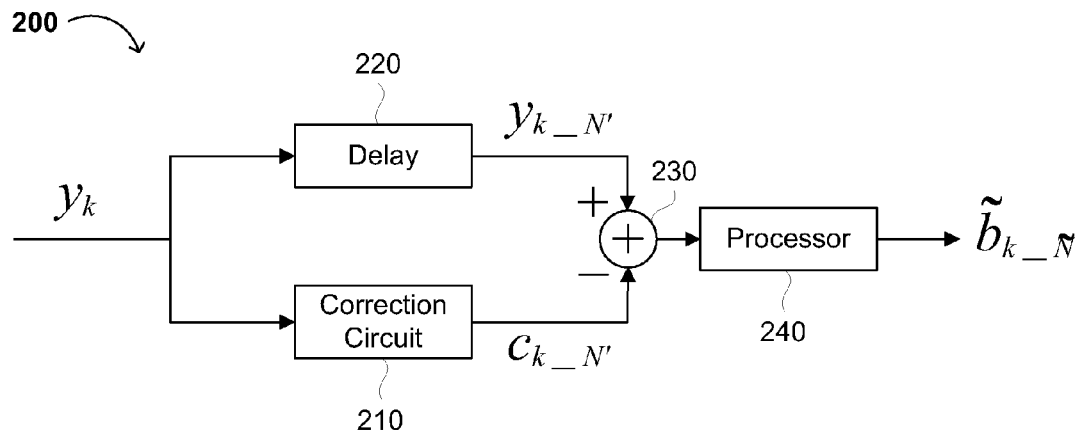
FIG. 2 is a block-level diagram showing an exemplary embodiment of the present unfolded decision-directed loop.

FIG. 2 shows a first exemplary unfolded decision-directed loop architecture 200, including a correction circuit 210, a delay circuit 220, a mathematical operator 230 and a signal processor 240. Each of the correction circuit 210 and delay circuit 220 a data signal receive a data signal $y_k$. Generally, data signal $y_k$ comprises data samples taken from a communication channel. In one example, the data signal $y_k$ comprises a data stream from a data recording medium, such as a magnetic recording medium (e.g., a hard drive) or an optical recording medium (e.g., a digital versatile disc). Alternatively, the channel may be a wired or wireless voice and/or data communications channel. Thus, the data signal $y_k$ may be binary (e.g., containing bits having values of 0 or 1, or alternatively, −1 or 1) or higher order (e.g., ternary [containing bits or symbols having values of −1, 0 or 1], quaternary, hexadecimal, etc.). Generally, the data signal $y_k$ is also serial, but the data signal $y_k$ may also be parallel (i.e., having a width of at least 2 bits or symbols), particularly in the case where an analog input is to be corrected. In the case of analog data, the data may be sampled, then converted into a multi-bit, parallel digital signal prior to correction by the present unfolded loop.

Correction circuit 210 generally converts data signal $y_k$ into a correction term $c_{k-N'}$. Correction circuit 210 generates correction term $c_{k-N'}$ from digital data (e.g., $y_k$) and one or more parameters, properties and/or characteristics of the channel that mimic the channel response. For example, correction term $c_{k-N'}$ may be generated from a characteristic polynomial of the channel, a cyclic property of the channel (e.g., noise or AC parameter value in a cyclostationary channel), or a DC offset value of the channel. Correction circuit 210 is explained in greater detail in FIG. 3.

The delay of the delay circuit 220 generally matches the characteristic delay of the correction circuit 210. The closer that the difference in delays is to zero (0), the greater the reduction in the effects of loop latency. Thus, in one embodiment, the first predetermined amount of delay provided by the correction circuit 210 is about equal to the second predetermined amount provided by the delay circuit 220. The smaller the absolute delays of the delay circuit 220 and the correction circuit 210 are, the smaller the total delay or latency of the unfolded decision-directed loop architecture 200. The delay circuit 220 may, for simplicity, comprise a series of inverters or one or more latches in series (e.g., a shift register) that have a characteristic delay associated with a number of bits or symbols in the data signal $y_k$ (e.g., N'), thereby resulting in a delayed data signal $y_{k-N'}$. Alternatively or additionally, where the delay (or delay difference) is very small, the delay circuit may comprise (or further include) a resistive element (e.g., a resistor or a signal path adding a small amount of resistance to the $y_{k-N'}$ term).

Generally, the function of the mathematical operator 230 is to correct the delayed data signal $y_{k-N'}$. In the example of FIG. 2, the mathematical operator 230 comprises an adder. In such an example, the correction term $c_{k-N'}$ may be inverted so that the effect of the adder is to subtract the correction term $c_{k-N'}$ from the delayed data signal $y_{k-N'}$. However, in other embodiments (e.g., where the unfolded decision-directed loop architecture 200 is part of an automatic gain control circuit, a decision-directed PLL, or a baseline wander correction circuit that operates on an analog input signal $y_k$), the mathematical operator 230 may comprise a multiplier and/or an integrator.

Signal processor 240 generally processes the corrected data signal using a final data processing operation to produce an information signal $\tilde{b}_{k-\tilde{N}}$. In various embodiments, the signal processor 240 comprises a second detector or a second comparator (and associated logic) (not shown). When the signal processor 240 receives a corrected data signal comprising a stream of bits or symbols, the signal processor 240 may comprise a second detector. In many embodiments, the characteristic input-output delay of the signal processor 240 is greater than each of the predetermined and/or characteristic delays of the delay circuit 220 and the correction circuit 210, thereby minimizing overhead and/or overall latency of the unfolded decision-directed loop.

Figure 3:
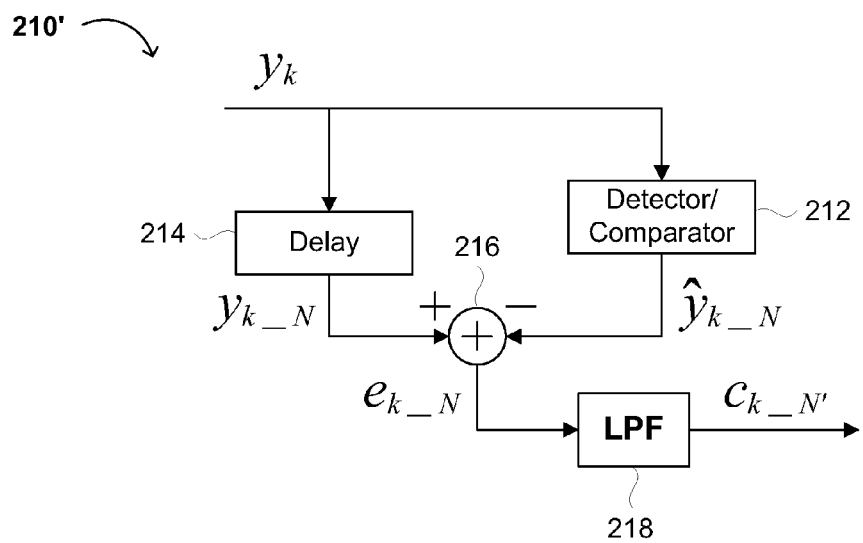
FIG. 3 is a block-level diagram showing an exemplary correction circuit for the present unfolded decision-directed loop.

FIG. 3 shows an exemplary correction circuit 210' suitable for use in the unfolded decision-directed loop 200 of FIG. 2. As shown in FIG. 2, the correction circuit 210' produces a correction signal or correction term $c_{k-N'}$ from data signal $y_k$. The correction circuit of FIG. 3 includes a detector or comparator 212, a delay circuit 214, a mathematical operator 216, and a low pass filter (LPF) 218. As will be discussed below with regard to FIG. 4, the detector/comparator 212 and delay circuit 214 may further include a filter (e.g., reflecting one or more parameters, values and/or characteristics of a channel) and/or logic configured to further process the output of the detector or comparator in the generation of the correction signal $c_{k-N'}$.

The detector/comparator 212 and delay circuit 214 receive a data signal $y_k$ (see the discussion above with regard to FIG. 2). The detector/comparator 212 outputs a preliminary data signal $\hat{y}_{k-N}$ from the data signal $y_k$. The preliminary data signal $\hat{y}_{k-N}$ is, in effect, the expected result of processing the data signal $y_k$. The detector/comparator 212 delays the preliminary data signal $\hat{y}_{k-N}$ at its output of the by N units of time relative to the data signal $y_k$ at its input. As a result, the delay circuit 214 is configured to delay data signal $y_k$ by N units of time in order to align the data signal $y_k$ (actually, the delayed data signal $y_{k-N}$) to the preliminary data signal $\hat{y}_{k-N}$.

The mathematical operator 216 combines or compares the delayed data signal $y_{k-N}$ and the preliminary data signal $\hat{y}_{k-N}$ to produce an error signal or error term $e_{k-N}$. In the example shown, mathematical operator 216 subtracts one of the delayed data signal $y_{k-N}$ and the preliminary data signal $\hat{y}_{k-N}$ from the other to determine the difference(s), if any. Subtracting (or comparing) the expected result of processing the data signal (preliminary data signal $\hat{y}_{k-N}$) to the data signal $y_k$ itself gives the error in the data signal $y_k$, and thus, the error induced by the channel in which the data signal $y_k$ was transmitted. Of course, other mathematical operations can be performed on the delayed data signal $y_{k-N}$ and the preliminary data signal $\hat{y}_{k-N}$ to provide the same or similar results.

Such transmission errors are generally expected to be low-frequency events. In a baseline wander application, such errors may be at or close to DC. Thus, to remove or reduce the effects of noise and/or other relatively high-frequency error sources, the error signal or error term $e_{k-N}$ may be passed through LPF 218. Alternatively, if one also wishes to remove relatively low-frequency sources of error, one may combine LPF 218 with a high pass filter (HPF) to define a frequency range for error corrections.

As mentioned herein, the present correction circuit and unfolded decision-directed loop may be used in a variety of applications. For example, in a DC baseline wander correction circuit (see, e.g., U.S. patent application Ser. No. 11/800,554, filed May 4, 2007, the relevant portions of which are incorporated herein by reference), the detector/comparator 212 comprises a comparator, data signal $y_k$ is generally an analog signal (e.g., a voltage or current) that has been sampled, converted to a parallel digital signal, and fed to the comparator 212 (which also receives the DC voltage or current or a digital representation thereof) to produce the preliminary data signal $\hat{y}_{k-N}$. The delay circuit 214 is configured to delay the data signal $y_k$ by an amount of time corresponding to the comparison and the analog-to-digital conversion, in which case the delay circuit 214 may comprise a "dummy" comparator (e.g., an identical comparator that compares data signal $y_k$ to ground or a zero current) and identical analog-to-digital converter (ADC) logic (not shown). It is well within the abilities of one skilled in the art to design and use unfolded loop correction circuits as described in this paragraph.

Automatic gain control (AGC) applications are somewhat similar to DC baseline wander correction, in that an analog data signal $y_k$ is generally received by the decision-directed control loop and passed through a comparator that compares the data signal $y_k$ to a target or reference value that corresponds to an ideal gain for the signal (see, e.g., U.S. patent application Ser. No. 12/187,241, filed Aug. 6, 2008, the relevant portions of which are incorporated herein by reference). Thus, in FIG. 3, the detector/comparator 212 comprises a comparator in an AGC loop. The delay circuit 214 in such an AGC loop may delay the analog data signal $y_k$ by an amount of time corresponding to the delay of the comparator 212. The delayed data signal $y_{k-N}$ and output of the comparator 212 (corresponding to the preliminary data signal $\hat{y}_{k-N}$) can be mathematically combined to form error signal or error term $e_{k-N}$, which is subsequently fed back into an amplifier that also receives the delayed data signal $y_{k-N}$. Thus, the processor 240 (see FIG. 2) in an AGC loop may comprise a variable gain amplifier. It is well within the abilities of one skilled in the art to design and use unfolded loop correction circuits as described in this paragraph.

In phase locked loop (PLL) applications, the "data" signal $y_k$ generally received by the decision-directed control loop is a periodic signal having a characteristic frequency or frequency range (see, e.g., U.S. Pat. No. 7,295,644 and/or U.S. patent application Ser. No. 11/376,601, filed Mar. 14, 2006, the relevant portions of each of which are incorporated herein by reference). Thus, the signal $y_k$ is generally compared to a reference signal having a predetermined (or fixed) frequency and phase (e.g., duty cycle). Thus, in FIG. 3, the detector/comparator 212 generally comprises a phase detector or phase-frequency detector. The delay circuit 214 may delay the data signal $y_k$ by an amount of time corresponding to the delay of the phase (or phase-frequency) detector 212. The delayed data signal $y_{k-N}$ and output of the comparator 212 (corresponding to the preliminary data signal $\hat{y}_{k-N}$) can be mathematically combined (generally by adding, subtracting, multiplying and/or integrating) to form error signal or error term $e_{k-N}$, which in one embodiment is subsequently fed into an interpolator that outputs a periodic signal of substantially the same frequency as the signal $y_k$, but with a corrected phase. Alternatively, the error term $e_{k-N}$ can be fed to a phase corrector (e.g., a digital filter that selects a point between two samples or reference values as a target value for the corrected phase). It is well within the abilities of one skilled in the art to design and use unfolded loop correction circuits as described in this paragraph.

Thus, the present correction circuit may comprise a detector or comparator configured to receive the data signal and provide a preliminary information signal therefrom, and a second mathematical operator configured to receive and mathematically combine the preliminary information signal and the delayed data signal to generate an error signal. The correction circuit may further comprise a filter configured to filter the error signal and produce the correction signal therefrom, and in some embodiments, a second delay circuit configured to delay the data signal by a third predetermined amount of time to provide a second delayed data signal.

Figure 4:
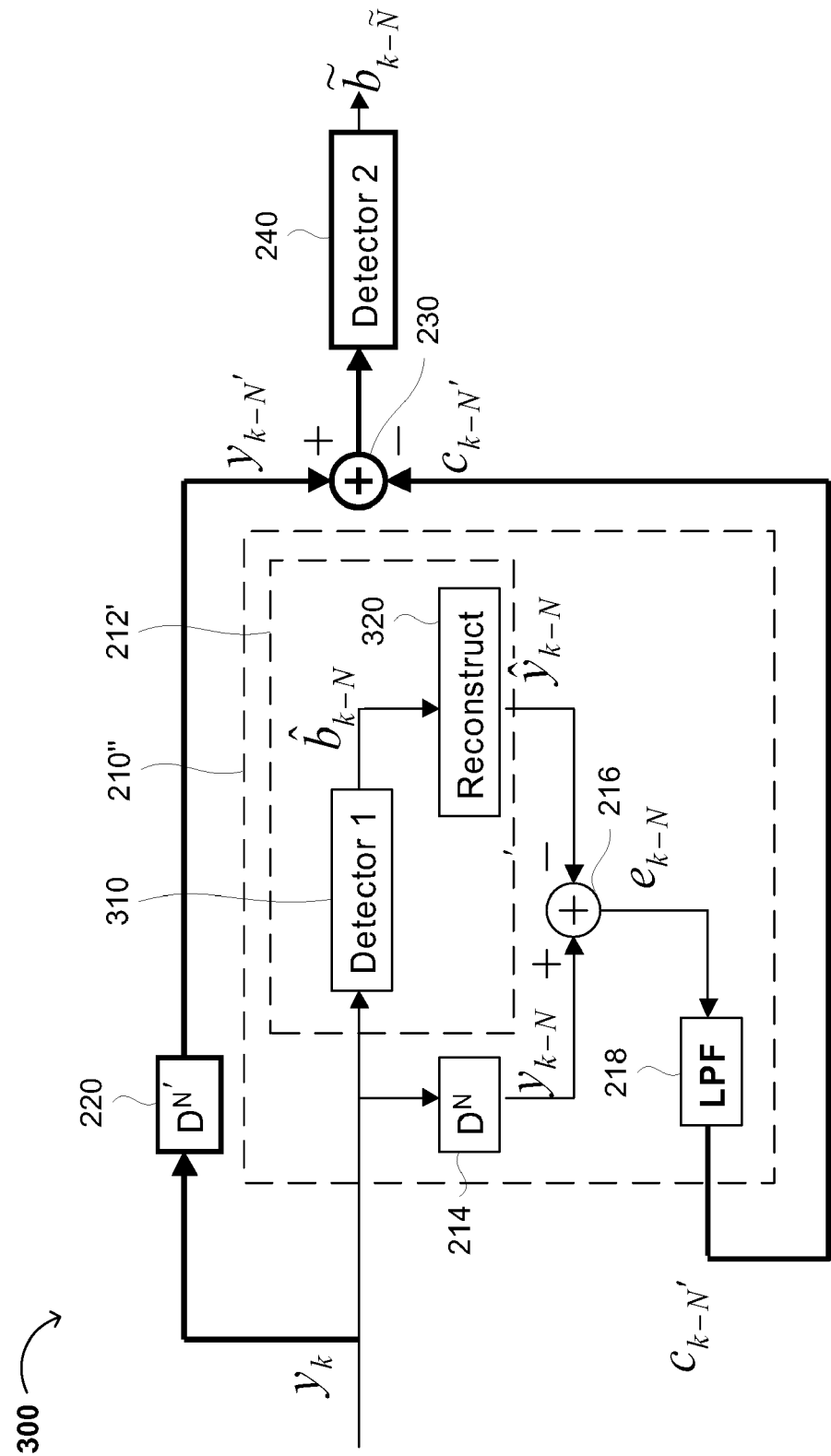
FIG. 4 is a block-level diagram of an exemplary embodiment of the present unfolded decision-directed loop, adapted to correct for baseline wander.

An exemplary implementation of an unfolded decision-directed baseline correction loop 300, configured to detect and correct errors in data sequences, is shown in FIG. 4. Loop 300 generally comprises correction circuit 210", delay circuit 220, and mathematical operator 230. Correction circuit 210" is substantially the same as correction circuit 210' of FIG. 3, but the detector/comparator 212 comprises a sequence detector 310 and a reconstruction filter 320. Reconstruction filter 320 is substantially the same as reconstruction filter 120 in FIG. 1, but when the reconstruction filter 320 includes a polynomial characteristic of the channel over which data $y_k$ were transmitted (e.g., a fixed DC response), the reconstruction filter 320 generally has a length equal to one plus the $\log_2$ of the number of states in the sequence detector 310. Thus, the present correction circuit may further comprise a channel filter configured to receive an output of the first detector and provide the preliminary information signal therefrom.

In the example of FIG. 4, the correction term $c_{k-N'}$ is computed largely as described above with respect to FIG. 3. The sampled data $y_k$ are fed to correction circuit 210" and a second branch comprising delay circuit 220, which delays data $y_k$ by N' units to align data $y_k$ with the correction term $c_{k-N'}$ at mathematical operator 230. The correction term $c_{k-N'}$ is then subtracted from the delayed samples $y_{k-N'}$ to remove the estimated offset. Because the correction term and samples are aligned, the delay of the first detector 310 does not limit the performance of the correction circuit 210". The result (i.e., the output of mathematical operator 230) is then fed to a second detector 240 to provide an improved estimate of the information (e.g., bit $\tilde{b}_{k-\tilde{N}}$). The total delay of the final decision is $\tilde{N}$ units, the combined delay of the first and second detectors 310 and 240 (and, in general, the LPF 218). Since the second detector 240 and the LPF 218 are outside of the loop, the delay associated with the second detector 240 and the LPF 218 does not impinge on the performance of the loop 210".

The first and second sequence detectors 310 and 240 may be identical or they may be different. Where the overall latency and complexity is not critical, using identical first and second sequence detectors 310 and 240 may ensure a maximum level of accuracy in corrections implemented by unfolded loop 300. However, to simplify the circuit and further reduce the first detector latency N, the first detector 310 may be simpler than the second detector 240.

For example, the first detector 310 may determine a preliminary information signal from a smaller number of possible states than that of the second detector 240. For instance, a shortened version of the channel polynomial Hk may be used to represent the channel. When the length of the polynomial Hk is reduced by one, the number of states in the Viterbi detector (e.g., first detector 310) can, in general, be decreased by 50%. Thus, when the first detector 310 comprises a Viterbi detector, the first detector 310 may have a traceback depth less than that of the second detector 240. Alternatively, the width of a parallel data signal into the first detector 310 can be reduced, for example by removing one or more of the most significant or least significant bits.

The above description of the new unfolded decision-directed loop referred to a simple baseline wander loop in FIG. 4 for illustration. The concept can be applied to any decision-directed loop. Thus, other embodiments may include a PLL for tracking timing errors, an AGC circuit for tracking gain errors, an adaptive equalization filter loop that tracks changes in the channel response (see, e.g., U.S. patent application Ser. No. 10/623,031, filed Jul. 17, 2003, the relevant portions of which are incorporated herein by reference), a power factor correction and/or control loop (see, e.g., U.S. Pat. No. 7,292,013, the relevant portions of which are incorporated herein by reference), and a power amplifier predistortion adjustment loop (see, e.g., U.S. Pat. No. 6,985,033, the relevant portions of which are incorporated herein by reference).

Figure 5:
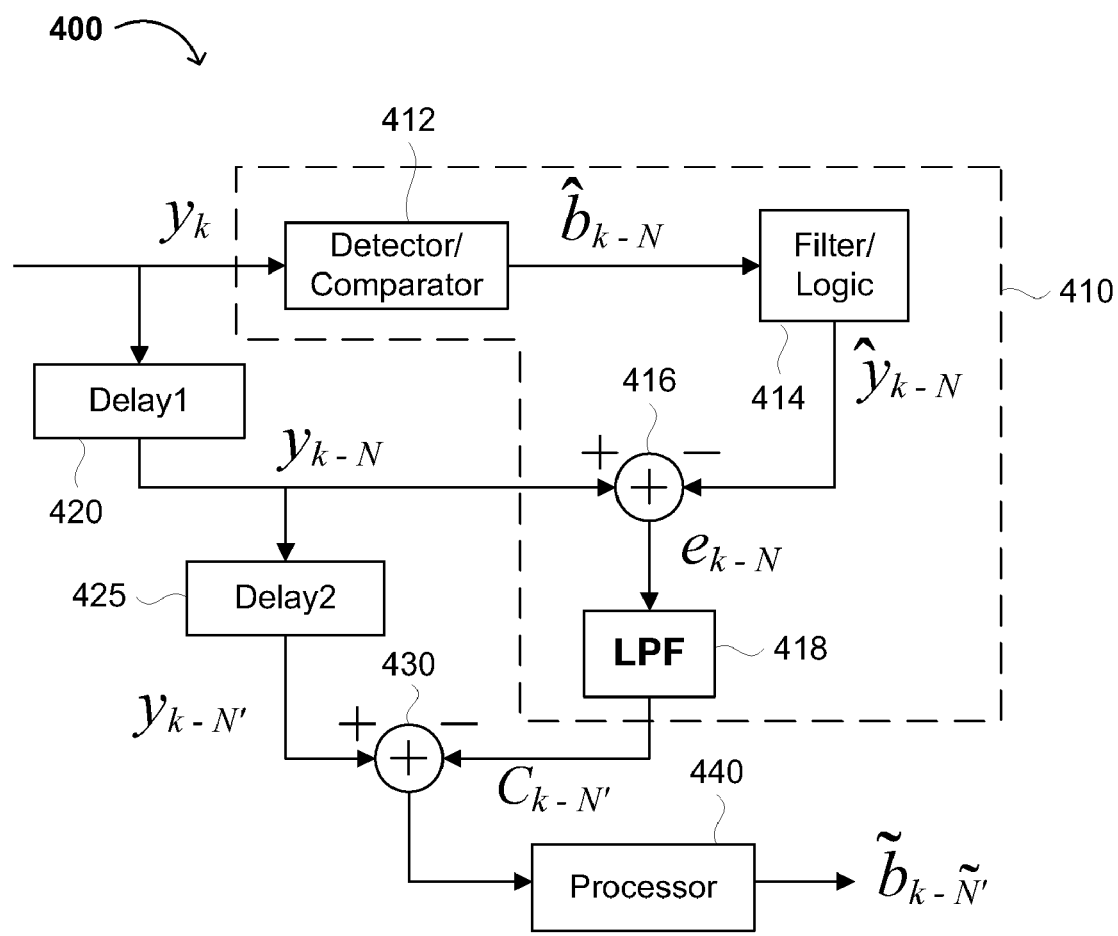
FIG. 5 is a block-level diagram of an alternative embodiment of the present unfolded decision-directed loop, adapted to correct for baseline wander.

FIG. 5 shows an exemplary alternative unfolded decision-directed loop 400, including correction circuit 410, first delay 420, second delay 425, first mathematical operator 430, and signal processor 440. The exemplary unfolded decision-directed loop 400 differs from that of FIG. 2 in that a serial delay circuit (i.e., first and second delays 420, 425) provides a first delayed signal $y_{k-N}$ used to generate the error term $e_{k-N'}$ and a second delayed signal $y_{k-N'}$ used to generate the corrected data signal to be processed by signal processor 440. In this case, the correction circuit 410 comprises detector or comparator 412, filter and/or logic 414, second mathematical operator 416, and output filter (e.g., LPF) 418. The delay of the first delay 420 is adapted or configured to match the delay of detector or comparator 412, and the delay of the second delay 425 is adapted or configured to match the delay of LPF 418. In some embodiments, the filter and/or logic 414 may include one or more characteristics of the channel over which the data was transmitted. The operation of unfolded decision-directed loop 400 is essentially the same as that of the unfolded decision-directed loop 200 of FIG. 2 and the correction circuit 210' of FIG. 3.

An Exemplary Method

Figure 6:
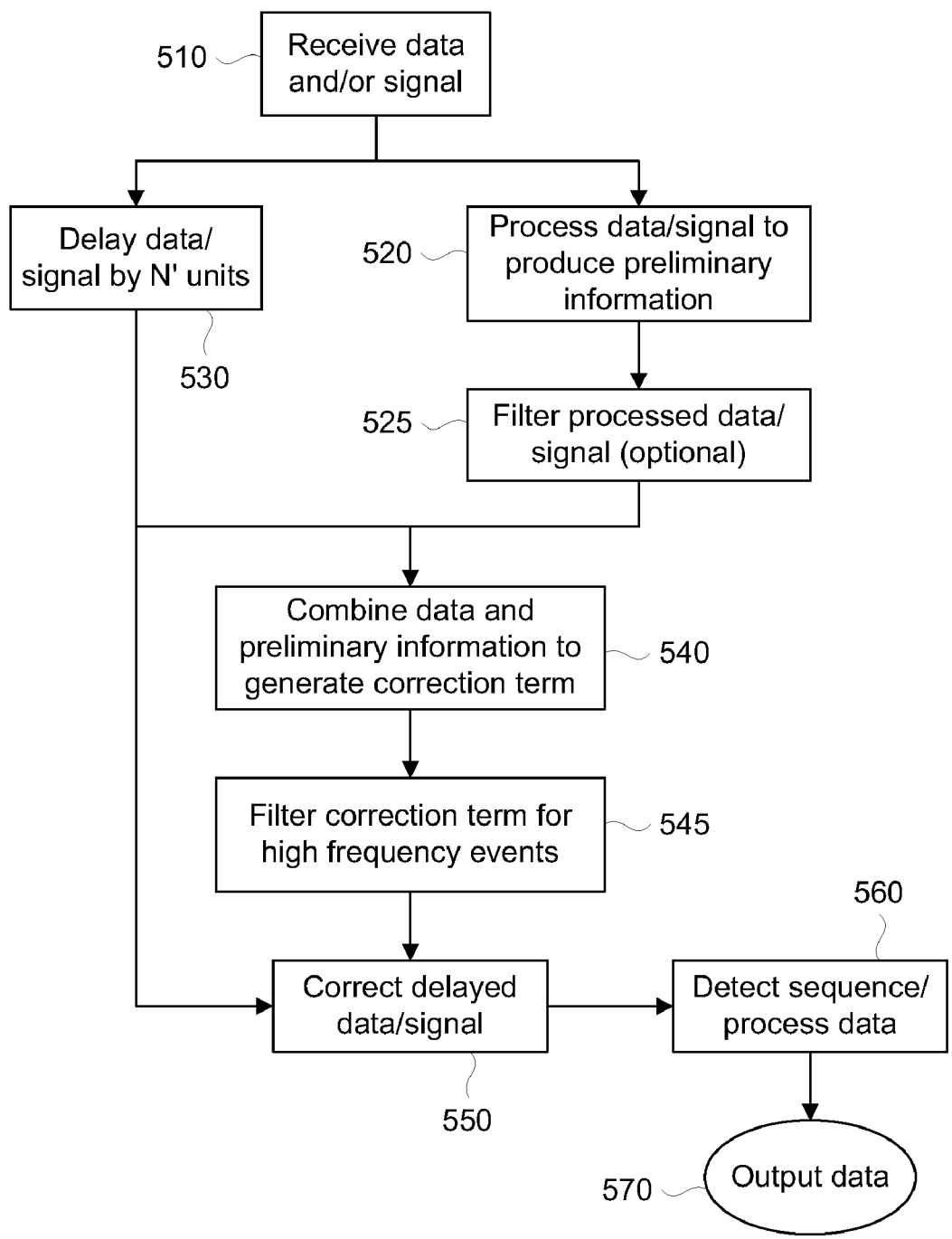
FIG. 6 is a flow diagram of an exemplary embodiment of the present method of reducing the effects of delay in an adaptive loop/correction circuit.

A further aspect of the invention relates to a method of processing data and/or a signal. FIG. 6 is a flow chart 500 of an exemplary method of processing data and/or a signal that reduces the effects of any delay in generating a correction term in an adaptive loop.

In step 510, data and/or a signal (herein, "data/signal") is/are received by the adaptive loop. In various applications (e.g., baseline wander, adaptive equalization, etc.), the data and/or signal comprise a serial bit stream, and the corrected data/signal output by the adaptive loop (see endpoint 570) comprise a corrected serial bit stream.

In step 520, the received data/signal are processed using a preliminary data processing operation to produce a preliminary information signal. As discussed above, the preliminary data processing operation may comprise detecting a data sequence (e.g., of a serial data stream), an electrical parameter value of the received signal, or a phase and/or frequency error in a received periodic signal. Alternatively, the preliminary data processing operation may comprise comparing an electrical parameter of the received signal to a reference value, or comparing a received periodic signal to a reference periodic signal. The processed data/signal may then be filtered or otherwise logically manipulated in step 525, but it is not required to do so in all applications. For example, the processed data/signal may be passed through a filter to remove effects of noise and other high-frequency events, or converted from an analog signal to a multi-bit digital signal, etc. In applications involving serial data (e.g., from magnetic or optical recording media), the preliminary data processing operation further comprises filtering the data sequence (e.g., using a reconstruction filter or other filter reflecting one or more channel properties or characteristics as described herein) to produce the preliminary information signal.

Separately, the data/signal are delayed by a first predetermined amount of time in step 530 to produce a first delayed signal. Optimally, the preliminary data processing operation has a characteristic input-output delay that is about the same as the first predetermined amount of time. Optionally, the data/signal may be delayed in a further separate path (not shown) by a second predetermined amount of time to produce a second delayed signal, which is then corrected using the correction term generated by the present correction circuit (see the discussion of step 550 below). In such embodiments, the second predetermined amount of time is about equal to the first predetermined amount of time. Such an arrangement/configuration effectively removes the effect of any delay in generating or producing the correction term (see the discussion of step 540 below).

In step 540, the preliminary information signal and the first delayed signal are mathematically combined to produce a correction signal or correction term. For example, the preliminary information signal and the first delayed signal may be added to produce the correction term, although one of these two signals (e.g., the preliminary information signal) may be inverted prior to the addition operation. Thereafter, in step 545, the correction signal or correction term may be passed through a filter (e.g., a low pass filter) to remove effects of high-frequency events (such as noise) and/or low frequency events.

In step 550, either the first delayed signal or the second delayed signal is corrected with the correction signal/term to produce the corrected data/signal. As for step 540, correcting the first or second delayed signal may comprise adding the correction signal/term and the first or second delayed signal, although one of these two signals (e.g., the correction signal/term) may be inverted prior to the adding step.

Finally, in step 560, the corrected data/signal is processed using a final data processing operation to produce a processed information signal. As described herein, when a serial data stream is received, the final data processing operation may comprise detecting a sequence of the corrected serial data stream. In one advantageous embodiment, the sequence of the corrected serial data stream that is detected is longer than the sequence of the serial data stream that is processed in step 520. After final processing, the final data/signal is output from the processor (see end block 570).

Exemplary Software

The present invention also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the invention relates to algorithms and/or software that implement the above method(s). For example, the invention may further relate to a computer program or computer-readable medium containing a set of instructions executable by a general purpose computer and/or an appropriate processing device (e.g., a signal processing device, such as a microcontroller, microprocessor or DSP device) that is configured to perform the above-described method and/or algorithm.

For example, the computer program may be on any kind of readable physical medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

The code is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

In various embodiments, when serial data are received, the set of instructions may comprise at least one instruction to change, adjust, select or optimize a data length (e.g., a traceback depth) or a data width to be processed in generating the error and/or correction term for a given application. In one embodiment where the data length, data width or traceback depth is selectable, the same design can be used to provide a number of different versions of the integrated circuit (IC). For example, where the data width or traceback depth matches that of the processor (e.g., 240 in FIG. 2), the IC may be a "minimum error rate" version. Such a robust IC product may be advantageous in an application where the additional latency has minimal effect. Alternatively, where the data width or traceback depth is relatively small, the IC may be a low-latency version. Such a low-latency IC product may be advantageous in an application where a relatively high error rate is tolerable. In such cases, the computer-readable medium may further comprise at least one instruction to change, adjust or optimize the first predetermined amount of time to match the input/output delay of the circuitry that produces the preliminary information signal (e.g., detector/comparator 212, 212' in FIGS. 2-3). In embodiments employing two delay circuits (e.g., FIG. 4), the computer-readable medium may comprise at least one further instruction to change, adjust or optimize the second predetermined amount of time data to match the input/output delay of the circuitry that produces the correction term or signal.

Exemplary Systems and Network(s)

A further aspect of the present disclosure concerns a receiver, comprising the present unfolded decision-directed loop circuit and a receiver port communicatively coupled to the circuit, configured to receive the data/signal from a recording medium or a network. In one example, the receiver is embodied on a single integrated circuit.

The present disclosure also concerns a system for transferring data on or across a network, comprising the present receiver and at least one transmitter communicatively coupled to the receiver port, configured to transmit the data signal to the receiver port. In further embodiments, the receiver and/or system may be configured to convert serial data from the network or storage medium to parallel data. Additionally, the system (or integrated circuit comprising the receiver) may be configured to convert parallel data to serial data for the network and/or storage medium.

A network in accordance with the present disclosure may comprise a plurality of the present systems, communicatively coupled to each other; and a plurality of data storage or communications devices, each of the data storage or communications devices being communicatively coupled to at least one of the systems. The network may be any kind of known network, such as a storage network (e.g., RAID array), Ethernet, or wireless network.

CONCLUSION/SUMMARY

Thus, the present disclosure provides unfolded adaptive/decision-directed loops and/or correction circuits therefor, architectures, apparatuses and systems including the same, and methods, algorithms and software for processing signals and/or data that reduce the effects of latency in such loops. Embodiments concern a correction circuit configured to remove effects of loop latency by aligning a correction term and a received sample. The adaptive loop generally includes a correction circuit receiving a data signal and providing a correction signal based thereon, delayed by a first amount of time; a delay circuit that delays the data signal by a second amount of time; a mathematical operator that mathematically combines the correction signal and the delayed data signal to generate a corrected data signal; and a signal processor that processes the corrected data signal and produces an information signal therefrom.

The method generally comprises processing data and/or a signal using a preliminary data processing operation to produce a preliminary information signal; separately, delaying the data/signal by a first predetermined amount of time to produce a first delayed signal; optionally, delaying the data/signal by a second predetermined amount of time to produce a second delayed signal; combining the preliminary information signal and the first delayed signal to produce a correction signal; correcting either the first delayed signal or the second delayed signal with the correction signal to produce corrected data and/or a corrected signal; and processing the corrected data/signal using a final data processing operation to produce a processed information signal.

By delaying the data/signal before the correction term is applied, the correction term and the data/signal can be aligned in time. When the data/signal is aligned with the correction term, the effect of the correction circuit delay is removed. Disclosed embodiments therefore advantageously reduce effects of loop latency, improve the accuracy of corrections in an adaptive loop, and minimize overhead and delays associated with such improvements.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit, comprising:
a correction circuit to receive data and provide a correction signal based on the data, the correction circuit delaying the received data by a first predetermined amount of time, wherein the correction signal is generated in part as a function of the delayed received data and a processed version of the received data;
a first delay circuit to delay the data by a second predetermined amount of time to provide a first delayed signal;
a first mathematical operator to receive and mathematically combine the correction signal and the first delayed signal to generate corrected data; and
a signal processor to process the corrected data and produce an information signal therefrom.

2. The circuit of claim 1, wherein the correction circuit comprises:
a first detector to receive the data and produce a preliminary information signal as the processed version of the received data; and
a second mathematical operator to receive and mathematically combine the preliminary information signal and the delayed version of the received data to generate an error signal.

3. The circuit of claim 2, wherein the correction circuit further comprises a first filter to filter the error signal and produce the correction signal.

4. The circuit of claim 3, wherein the first filter comprises a low pass filter.

5. The circuit of claim 4, wherein the first filter further comprises a high pass filter.

6. The circuit of claim 3, wherein the correction circuit further comprises a second delay circuit to receive the data and delay the data.

7. The circuit of claim 3, wherein the correction circuit further comprises a second filter to receive an output of the first detector and provide the preliminary information signal.

8. The circuit of claim 3, wherein the signal processor comprises a second detector.

9. The circuit of claim 1, wherein the first predetermined amount is about equal to the second predetermined amount.

10. The circuit of claim 1, wherein the signal processor has a characteristic input-output delay equal to or greater than a difference between the first predetermined amount and the second predetermined amount.

11. A receiver, comprising:
the circuit of claim 1; and
a receiver port communicatively coupled to the circuit, the receiver port to receive the data from a recording medium or a network.

12. The receiver of claim 11, embodied on a single integrated circuit.

13. A system for transferring data on or across a network, comprising:
the receiver of claim 11; and
at least one transmitter communicatively coupled to the receiver port, to transmit the data to the receiver port.

14. A network, comprising:
a plurality of the systems of claim 11, communicatively coupled to each other; and
a plurality of data storage or communications devices, each of the data storage or communications devices being communicatively coupled to at least one of the systems.

15. A method of processing data, comprising:
processing the data using a preliminary data processing operation to produce a preliminary information signal;
separately, delaying the data by a first predetermined amount of time to produce a first delayed signal;
optionally, delaying the data by a second predetermined amount of time to produce a second delayed signal;
combining the preliminary information signal and the first delayed signal to produce a correction signal;
correcting either the first delayed signal or the second delayed signal with the correction signal to produce corrected data; and
processing the corrected data using a final data processing operation to produce a processed information signal.

16. The method of claim 15, wherein the data comprises a serial data stream and the corrected data comprises a corrected serial data stream.

17. The method of claim 16, wherein the final data processing operation comprises detecting a sequence of the corrected serial data stream.

18. The method of claim 17, wherein the preliminary data processing operation further comprises filtering the sequence of the corrected serial data stream to produce the preliminary information signal.

19. The method of claim 15, comprising delaying the data by the second predetermined amount of time to produce the second delayed signal, wherein the second delayed signal is corrected with the correction signal to produce the corrected data.

20. A computer readable-medium containing a computer-executable set of instructions adapted to execute the method of claim 15.

* * * * *